Aug. 25, 1959     C. A. HENN-COLLINS     2,900,848
MECHANICAL SELECTIVE POSITIONING MECHANISM
Filed April 8, 1955
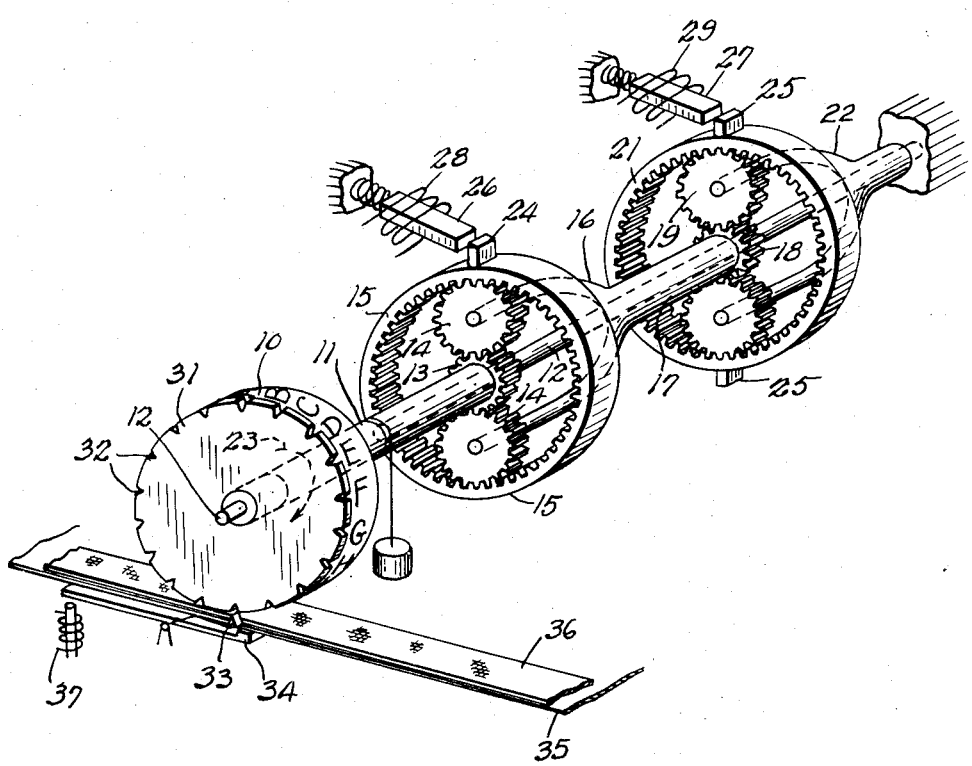
INVENTOR.
Christopher Arthur Henn-Collins
BY.

2,900,848

MECHANICAL SELECTIVE POSITIONING MECHANISM

Christopher Arthur Henn-Collins, London, England

Application April 8, 1955, Serial No. 500,262

Claims priority, application Great Britain April 9, 1954

4 Claims. (Cl. 74—768)

This invention relates to selective positioning mechanisms intended to bring a controlled member such as an indicating member into a desired position out of a number of possible positions under the control of appropriate code impulses or signals. The invention may be applied to type printing telegraph apparatus or for other purposes where it is required, e.g., to convert code signals to positional data, e.g. telerotation devices, computers particularly of the analogue type, calculating machines and the like.

It is an object of the invention to provide an improved mechanism for the above purposes which is relatively simple to manufacture and can be readily adapted to a large variety of conditions.

According to the invention the position of a controlled member is determined by two or more rotatable members serially connected to the controlled member by differential or epicyclic gear trains and the angular motion of one of the elements of each of the gear trains or of the associated rotatable member is variably or selectively determinable so that when a drive is applied to the series the final motion obtained is the algebraic sum of the motions determined by the individual members and connecting gear trains.

Variation of the permitted angular movements of the individual members or gear train elements constituting the series is conveniently effected by movable or adjustable stops which are controlled by the code impulses or signals received. It will be understood that such stop means can be arranged to limit the angular motion of any one of the elements of the gear train. Thus in a convenient arrangement where the connecting gear trains are constituted by sun or pinion, planet or intermediate, and annulus gear elements the variable stop means are applied to the annulus elements, and motion is transmitted from the sun or opinion gear of one train to the planet carrier of the next train. It will also be understood that the permitted angular movements may be different for each movable member or gear assembly, e.g., multiples or fractions of a given unit movement, so that a large number of possible final positions can be afforded. Also the ratios of the individual trains can be varied for the same purpose, or a combination of both these methods may be employed.

For a more complete understanding of the invention, reference should be had to the accompanying drawing in which the single figure is a perspective view of one form of apparatus according to the invention.

In one convenient arrangement according to the drawing the controlled member comprises an indicating member such as a disc or wheel, e.g., the type wheel of a type printing telegraph apparatus. The drum 10 is attached to a sleeve 11 rotatable on a fixed shaft 12 and secured to a sun gear 13 meshing with planet gears 14 which again mesh with an annulus gear 15. The planet carrier 16 is attached to a second sleeve 17 rotatable on the said shaft and attached to a pinion gear 18 of a similar epicyclic train having intermediate gears 19 and an annulus gear 21. The carrier 22 of this second gear train can be similarly connected to a third train and so on for as many gear train assemblies as are required or can be connected to an abutment as shown.

A steady torque is applied to the controlled disc sleeve 11 by any convenient means represented by broken arrow 23, for example by a weight attached to a cable coiled on the sleeve. The ratios of the different gear trains are the same in this example.

The annulus gears 15 and 21 are each provided with radial projections 24 and 25, respectively. Also there is associated with each annulus gear 15 and 21 a stop or detent 26 and 27, respectively, which is movable to either of two positions for engaging with the appropriate radial projections as desired. On the first annulus gear 15 there is one radial projection 24. On the second annulus gear 21 there are two radial projections 25 spaced 180° apart. The gearing is so arranged that if the first annulus gear 15 is allowed to rotate through 360°, the other gear train being stationary, the controlled disc will rotate through 180°. The said stop 24 is therefore adapted to determine two discrete positions of the disc 180° apart. Similarly, movement of the stop of the second annulus gear 21 alone is adapted to determine two discrete positions of the disc 90° apart, independently of any motion which may be imparted by the first annulus. The arrangement so far described is adapted to determine four discrete positions of the disc according to a binary code. To obtain thirty-two discrete positions a further three gear train assemblies would require to be added.

It will be seen that the arrangement of the projections which are engaged by the stops or detents can be widely varied to obtain different motions of the final member of the series, exemplified in the above example by the disc. Also the gear ratios may be different for different gear trains to obtain different multiples or fractions of a given unit of rotary or angular motion. The movement of the stops which controls the positional motion of the final member can be effected in any desired manner, e.g. by electromagnetic devices 28 and 29 or other devices, and code impulses or signals can be applied thereto in any convenient or known manner. The detents 26 and 27 may be spring biased against stops 24 and 25, respectively, as shown.

Since the gears of the various trains may be subject to a certain amount of backlash affecting the accuracy of positioning of the final or controlled member, it may be desirable to apply a final correction to the said member to bring it accurately to the desired position. This may be accomplished, for example, by an associated wheel 31 having tapering openings 32 which can be engaged when required by a complementary V-shaped centering tooth 33 movable radially inwardly to the wheel. The tooth is actuated after the disc has been positioned by the mechanism and the arrangement is such that if the disc is slightly to one side or the other of the desired position, this inaccuracy is corrected by the action of the centering tooth. The tooth 33 may be spring biased and made to move by the movement of the printing hammer 34 against the paper 35 and ribbon 36 as by action of electromagnet 37 under a printing impulse.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A mechanism for bringing a controlled unit into a position selected from a plurality of possible predetermined positions, said mechanism comprising a gear system, including a sun gear attached to the controlled unit, means for applying a driving torque to said sun gear, a planet gear meshing with said sun gear and adapted to rotate a predetermined magnitude about the center of said sun gear, a first regulating means for regulating the magnitude of rotative movement of said planet gear about said sun gear, an annulus gear meshing with said planet gear and adapted to rotate a predetermined magnitude about the center of said sun gear, and a second regulating means for regulating the magnitude of rotative movement of said annulus gear about said sun gear, the motion imparted to said controlled unit being the algebraic sum of the rotative movements of said sun gear and said annulus gear.

2. A cascade of gear systems for producing an aggregate motion comprising a sun gear to which a driving torque is applied, a planet gear meshing with said sun gear and adapted to rotate about the center of said sun gear a predetermined magnitude, a first annulus gear meshing with said planet gear and adapted to rotate a predetermined magnitude, a pinion gear connected to said planet gear, an intermediate gear meshing with said pinion gear, means for holding said intermediate gear in a predetermined position to prevent rotation thereof around the center of said pinion gear, a second annulus gear meshing with said intermediate gear, stop means cooperating with said second annulus gear for predetermining a certain portion of a revolution thereof and consequently determining the said rotation of said planet gear and following the motion of said sun gear, means for releasing said stop means, a further stop means operating with said first annulus gear for predetermining a certain portion of a revolution thereof and consequently determining the further motion of said sun gear, and means for releasing said further stop means.

3. A cascade of gear systems for producing an aggregate motion comprising a sun gear to which a driving torque is applied, a planet gear meshing with said sun gear and adapted to rotate about the center of said sun gear a predetermined magnitude, a first annulus gear meshing with said planet gear and adapted to rotate a predetermined magnitude, a pinion gear connected to said planet gear, an intermediate gear meshing with said pinion gear, means for holding said intermediate gear in a predetermined position to prevent rotation thereof around the center of said pinion gear, a second annulus gear meshing with said intermediate gear, stop means operating with said second annulus gear for predetermining a certain portion of a revolution thereof and consequently determining the said rotation of said planet gear and following motion of said sun gear, means for releasing said stop means, further stop means operating with said first annulus gear for predetermining a certain portion of a revolution thereof and consequently determining the further motion of said sun gear, means for releasing said further stop means, and an indicating member positioned by the movement of the first sun gear.

4. A cascade of gear systems for producing an aggregate motion comprising a sun gear to which a driving torque is applied, a planet gear meshing with said sun gear and adapted to rotate about the center of said sun gear a predetermined magnitude, a first annulus gear meshing with said planet gear and adapted to rotate a predetermined magnitude, a pinion gear connected to said planet gear, an intermediate gear meshing with said pinion gear, means for holding said intermediate gear in a predetermined position to prevent rotation thereof around the center of said pinion gear, a second annulus gear meshing with said intermediate gear, stop means operating with said second annulus gear for predetermining a certain portion of a revolution thereof and consequently determining the said rotation of said planet gear and following motion of said sun gear, means for releasing said stop means, further stop means operating with said first annulus gear for predetermining a certain portion of a revolution thereof and consequently determining the further motion of said sun gear, means for releasing said further stop means, an indicating member positioned by the movement of the first sun gear, and means for finally adjusting the position of said indicating member.

References Cited in the file of this patent

UNITED STATES PATENTS

| 2,046,977 | Sortore et al. | July 7, 1936 |
| 2,407,696 | Webster | Sept. 17, 1946 |
| 2,539,509 | Estoup | Jan. 30, 1951 |
| 2,564,271 | Millns | Aug. 14, 1951 |
| 2,612,792 | Wilson | Oct. 7, 1952 |

FOREIGN PATENTS

| 147,174 | Germany | Dec. 24, 1903 |